May 7, 1968 — M. G. BOUIX — 3,382,502
LINEAR ARRAY OF HORN ANTENNAS WITH PHASING
AND AMPLITUDE CONTROL FOR SCANNING
Filed April 1, 1965 — 3 Sheets-Sheet 1

Maurice Gédéon Bouix
By Littlepage & Quaintance
Attys.

May 7, 1968
M. G. BOUIX
3,382,502
LINEAR ARRAY OF HORN ANTENNAS WITH PHASING
AND AMPLITUDE CONTROL FOR SCANNING
Filed April 1, 1965
3 Sheets-Sheet 2
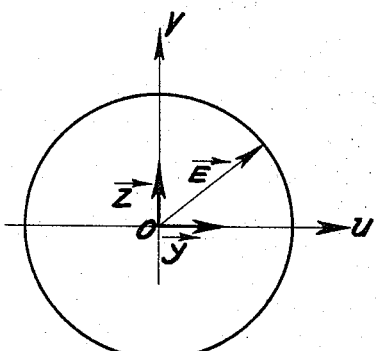
Fig.10
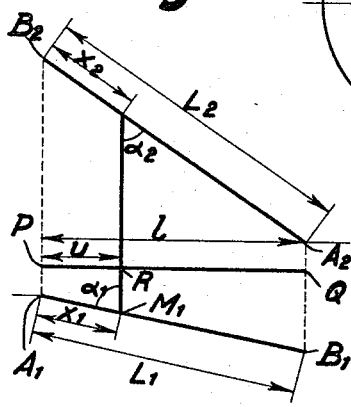
Fig.1a
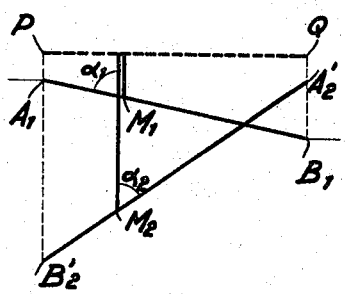
Fig.5a
Fig.11
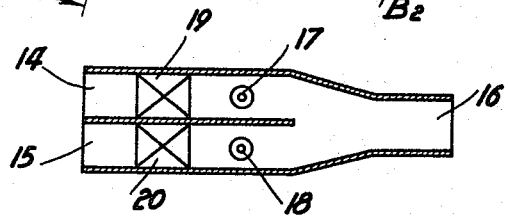
Fig.12
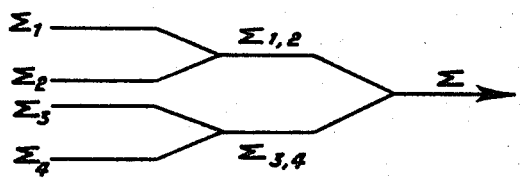
Maurice Gédéon Bouix
By Littlepage & Quaintance
Attys.

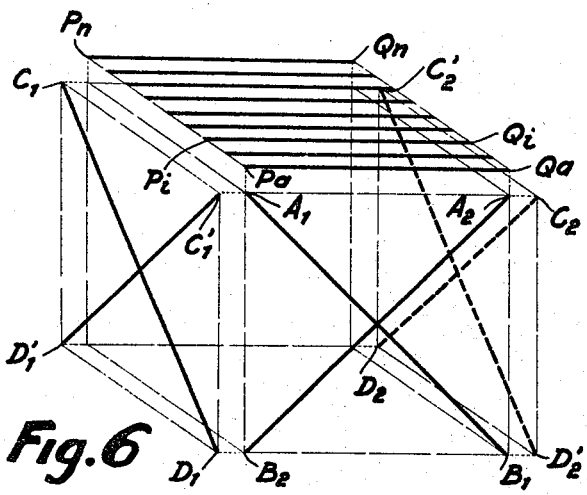
Fig. 6
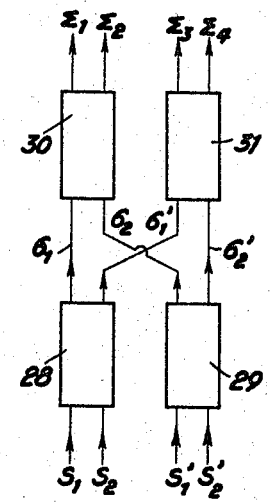
Fig. 8
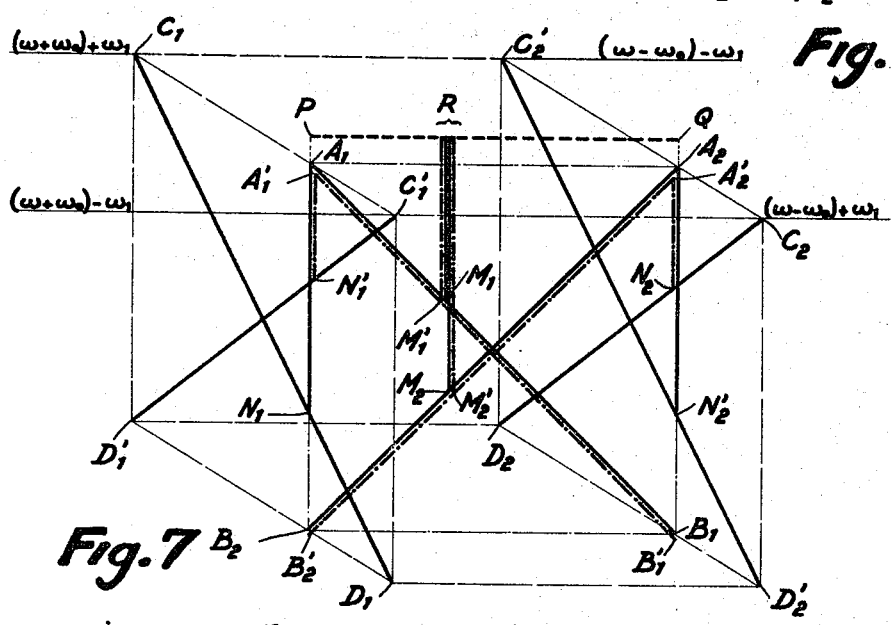
Fig. 7
$$\Sigma_3 = e^{j\omega t}\cos(\omega_1 t + \tfrac{\pi}{2})\cos\omega_0 t \qquad \Sigma_2 = e^{j(\omega t + \psi)}\cos\omega_1 t \cos(\omega_0 t + \tfrac{\pi}{2})$$
$$\Sigma_4 = e^{j\omega t}\cos(\omega_1 t + \tfrac{\pi}{2})\cos(\omega_0 t + \tfrac{\pi}{2}) \qquad \Sigma_1 = e^{j(\omega t + \psi)}\cos\omega_1 t \cos\omega_0 t$$
Fig. 9
Maurice Gédéon Bouix
By Littlepage & Quaintance
Attys.

United States Patent Office 3,382,502
Patented May 7, 1968

3,382,502
LINEAR ARRAY OF HORN ANTENNAS WITH PHASING AND AMPLITUDE CONTROL FOR SCANNING
Maurice Gédéon Bouix, Paris, France, assignor to Societe Anonyme: Societe Alsacienne de Constructions Atomiques de Telecommunications et d'Electronique, Paris, France, a corporation of France
Filed Apr. 1, 1965, Ser. No. 444,632
Claims priority, application France, Apr. 7, 1964, 970,026
8 Claims. (Cl. 343—777)

The present invention relates to the rapid pointing of an electromagnetic beam emitted by one or more linear arrays of radiators.

It is known that in order to obtain a directive electromagnetic beam it is generally necessary to dispose primary sources along a rectilinear array; a suitable form of the beam is obtained by appropriate distribution of amplitudes and phases. If $x$ designates the abscissa of a source along the array, the superimposition on the phase law adopted for the formation of the beam of a linear phase law at $x$, namely $\Delta\varphi = hx+1$ ($h$ and $1$ being constants) inclines the direction of the beam by an angle dependent on the coefficient $h$. In order to act rapidly on the direction of a beam, the expedient has been conceived of placing on each radiator a ferrite phase shifter the phase shifting of which is controlled by the current passing through a coil. The phase shift introduced by ferrites, however, depends on temperature, frequency, power, and even on previous states (hysteresis).

The object of the invention is an apparatus which makes it possible to effect phase shifts capable of varying continuously and practically independent of the physical properties of the materials used. Insofar as this device entails the utilisation of ferrites, these employ the Faraday effect under conditions in which their physical properties act only on secondary characteristics of the beam.

The apparatus according to the invention is effective both for transmission and for reception.

This apparatus comprises fundamentally a linear array constituted by a plurality of radiators forming a linear array and arranged to radiate an arbitrary polarization wave; means of separately producing the two side bands of a sinusoidally modulated carrier frequency and means for varying the frequency of this sinusoidal modulation; two waveguides feeding said linear array; means of applying the two said side bands respectively to the inputs of said feed waveguides; couplers spaced on each of these feed waveguides starting from the input of the latter, the number of such couplers being equal to the number of radiators, each coupler of a given order on one of the feed waveguides and each coupler of inverse order on the other feed waveguide being respectively connected to two links of waveguides leading respectively to the two inputs of a Riblet type coupler, thus producing at the two outputs of said Riblet type coupler two signals on the carrier frequency which are respectively modulated in amplitude by two sinusoids in quadrature, and means for combining these two signals and applying them to the corresponding radiator. Riblet-type couplers are well known in the prior art and are discussed, for instance, in the Proceedings of I.R.E., pp. 180–184, February 1952 in an article by Henry J. Riblet, entitled, "The Short-Slot Hybrid Junction."

If the angular frequency $\omega_0$ of the modulation is very low in relation to the angular frequency $\omega$ of the carrier frequency, the means for combining the two final signals last mentioned and applying them to each radiator may, for example, be composed by a circular symmetry waveguide associated with said radiator, and to the base of which the outputs of the corresponding Riblet type coupler are connected through two waveguides acting on said circular symmetry waveguide at two orthogonal points.

If the angular frequency $\omega_0$ is a considerable fraction of the angular frequency of the carrier, in order to avoid division into two of the radiated beam, the means for combining the two final signals leaving the Riblet coupler must preferably consist of a coupler of known type having two inputs and one output and comprising means of varying the respective admittances of the two inputs in synchronism with the angular frequency $\omega_0$, these admittances being such that the amplitude of the output signal no longer depends in theory on the modulation, but that the phase of said output signal dependent on $\omega_0$ remains the phase suitable for the radiator considered.

As will be explained in detail hereinbelow, this arrangement makes it possible to provide at the output of the radiators a beam the inclination of which varies with the angular frequency $\omega_0$ of the modulation in the plane of the axes of the radiators.

It is possible to obtain a beam the inclination of which can vary in all directions by associating a plurality of linear arrays in order to form a group of parallel arrays each comprising a plurality of radiators, each radiator of a linear array being fed by four lengths of guides coupled respectively two by two, in the manner defined above, to two juxtaposed pairs of special feed waveguides, one of the ends of the special juxtaposed feed waveguides, belonging to one of the pairs associated with the different linear arrays, being connected to lengths of waveguide coupled in the manner defined above to a first pair of general feed waveguides, and the corresponding opposite end of the special juxtaposed feed waveguides, belonging to the other pair associated with the different linear arrays, being connected in the same manner to a second pair of general feed waveguides similar to the first pair, the lengths of waveguides associated with a given radiator and coupled to the special feed waveguides fed by the first pair of general feed waveguides leading moreover respectively to the inputs of a first Riblet type coupler and the other two lengths associated with the same radiator similarly leading to the input of a second Riblet type coupler, one of the outputs of the first Riblet type coupler and one of the outputs of the second being respectively connected to the inputs of a third Riblet type coupler and the other outputs of the first and second Riblet type couplers being respectively connected to the inputs of a fourth Riblet type coupler, and the outputs of said third and fourth Riblet type couplers being respectively connected to means arranged to combine the four signals thus obtained and to apply them to the radiator considered, means being provided to produce separately the side bands of a carrier wave of frequency $\omega$, sinusoidally modified by a frequency $\omega_0$, in order to remodulate sinusoidally these two side bands by a frequency $\omega_1$ and to separate the side bands from the signals resulting from this double modulation and to supply at the respective ends of the four general feed waveguides the resulting signals of angular frequencies $\omega+\omega_0+\omega_1$, $\omega+\omega_0-\omega_1$, $\omega-\omega_0+\omega_1$ and $\omega-\omega_0-\omega_1$, and also to vary at will the frequencies $\omega_0$ and $\omega_1$.

As previously, the means designed to combine the four signals coming from the third and fourth Riblet type couplers may be constituted, if the angular modulation frequency remains very low in relation to that of the carrier, by a circular symmetry waveguide associated with the radiator considered, to the base of which the outputs of the third and fourth Riblet type couplers are connected by waveguides acting on said circular symmetry waveguide at four suitably selected points, which are orthogonal two by two, and in the opposite case by a group of two couplers each provided with two inputs the admittances of which are modulated to the angular frequency $\omega_0$, which outputs feed the inputs of a third coupler which have variable admittances modulated to the angular frequency $\omega_1$, the output of said third coupler being without amplitude modulations at $\omega_0$ and $\omega_1$ but retaining the phase dependent on $\omega_0$ and $\omega_1$ intended for the radiator.

Two examples of application of the invention are described hereinbelow with reference to the accompanying drawings, in which:

FIGURES 1 and 1a are geometrical diagrams intended to facilitate the explanation of the invention;

FIGURES 5 and 5a are diagrammatical views of two arrangements according to the invention in the case of a single linear array;

FIGURE 6 is a geometrical diagram intended to explain the application of the invention in association with a plurality of parallel linear arrays forming a flat array;

FIGURE 7 is a diagrammatical view in perspective of the embodiment of such an application;

FIGURE 8 is a diagram of the couplers combining the signals supplied in this case to each radiator;

FIGURE 9 is a diagrammatical view of the feeding of the circular waveguide of a radiator of this type;

FIGURE 10 is a diagram illustrating the composition of the rotating dipole constituted by a radiator;

FIGURE 11 is a diagram of a coupler having two inputs of variable admittances;

FIGURE 12 is a diagram of the combination of couplers of this type in the case of a flat array.

Figure 1:
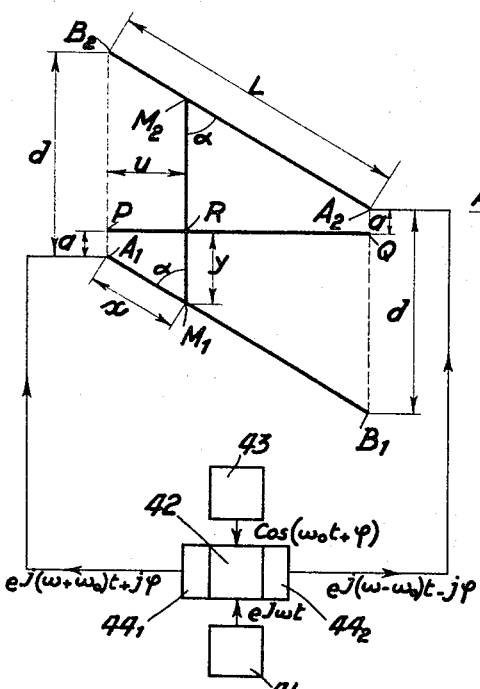
Figure 2:
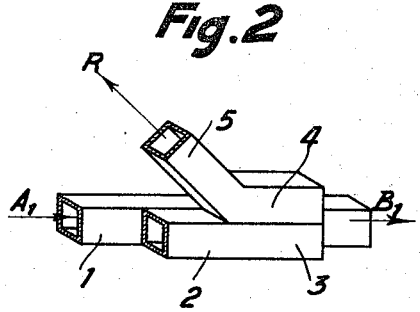
FIGURE 2 is a perspective view of a coupling apparatus utilisable in the arrangements according to the invention.

As illustrated in FIGURE 1, the arrangement according to the invention comprises, in its simplest embodiment, a linear array constituted by a multiplicity of radiators aligned parallel and the axes of which, perpendicular to the longitudinal axis of the array, are substantially equidistant, these radiators being fed, as shown in FIGURE 1, by two waveguides $A_1B_1$ and $A_2B_2$ which are parallel and consequently form a parallelogram the plane of which is cut by that containing the axes of the radiators of the array along a line PQ perpendicular to the sides $A_1B_1$ and $A_2B_1$ of said parallelogram and passing through the centre O of the latter. The position of one of the radiators of the array has been indicated at R. Through the medium of an assembly described below, said radiator receives two signals $\Sigma_1$ and $\Sigma_2$ which in turn, as will be explained in the course of the description of said assembly, are derived from two signals $S_1$, $S_2$ arriving at R through two waveguides $M_1R$, $M_2R$ situated in line with one another and parallel to the sides $A_1B_2$ and $A_2B_1$ of the parallelogram. These waveguides are coupled to the guides $A_1B_1$ and $A_2B_2$ at $M_1$ and $M_2$ by coupling devices of the type illustrated in FIGURE 2. According to this figure, a whole coupler is formed at the side of the main guide 1 ($A_1B_1$ or $A_2B_2$) by juxtaposition on the latter of a coupling element 2, suitable holes being pierced in the contiguous walls of the main guide 1 and of the coupling element 2. The latter is extended at 3 in the form of a Riblet coupler element with short-circuit, the second element 4 of which is connected by an elbow to the connecting guide 5 with the radiator R ($M_1R$ or $M_2R$), the obtuse angle of the elbow being additional to the acute angle $\alpha$ between the guides $A_1B_1$ and $M_1R$ or $A_2B_2$ and $M_2R$.

In the calculations below, the following equalities will be postulated:

$A_1B_1 = A_2B_2 = L$
$A_1P = QA_2 = a$
$A_1B_2 = A_2B_1 = M_1M_2 = d$
$A_1M_1 = x$
$M_1R = y$

The following are immediately deduced:

$d = L \cos \alpha + 2a$
$y = a + x \cos \alpha$

A generator 41 (FIGURE 1) produces a signal $e^{j\omega t}$ ($j$ being the symbol of the imaginaries) which is applied to a modulator 42 in which it is modulated in amplitude in accordance with the law $\cos(\omega_0 t + \varphi)$, $\omega_0$ being substantially smaller than $\omega$, by a signal produced by a generator 43.

The resulting modulated signal is therefore:

$$s = e^{j\omega t} \cos(\omega_0 t + \varphi)$$

This signal $s$ may also be written:

$$s = \tfrac{1}{2} e^{j(\omega + \omega_0)t + j\varphi} + \tfrac{1}{2} e^{j(\omega - \omega_0)t - j\varphi}$$

It may therefore be considered as being constituted by the superimposition of two signals of respective angular frequencies $(\omega + \omega_0)$ and $(\omega - \omega_0)$. Two filters $44_1$ and $44_2$ are combined with the modulator 2 to give at the output of the whole arrangement, these two respective signals, namely:

$$s_1 = \tfrac{1}{2} e^{j(\omega + \omega_0)t + j\varphi}$$
$$s_2 = \tfrac{1}{2} e^{j(\omega - \omega_0)t - j\varphi}$$

In practice, it may be easier to effect, in the low power stages, a modulation by $$2 \cos^2 \left( \frac{\omega_0 t}{2} + \frac{\varphi}{2} \right)$$

and we shall then have:

$$s^1 = 2 e^{j\omega t} \cos^2 \frac{\omega_0 t}{2} + \frac{\varphi}{2} = e^{j\omega t}[1 + \cos(\omega_0 t + \varphi)]$$
$$= e^{\omega t} + \tfrac{1}{2} e^{j(\omega + \omega_0)t + j\varphi} + \tfrac{1}{2} e^{j(\omega - \omega_0)t - j\varphi}$$

the filters $44_1$ and $44_2$ still giving the respective signals $s_1$ and $s_2$ referred to above.

The two signals $s_1$ and $s_2$ obtained in this manner are applied respectively to the inputs $A_1$ and $A_2$ of the feed waveguides $A_1B_1$ and $A_2B_2$. The parameter $\varphi$ intervening in the calculations now developed is assumed to take into account the phases obtained after the paths assumed to be equal, in the guides supplying the signals leading to said inputs $A_1$ and $A_2$. The conclusions would be the same if the paths were not equal.

Along the guides $A_1B_1$ and $A_2B_2$ the power of the signal is distributed to the successive radiators of the array by couplings such as $M_1$ and $M_2$.

If $\lambda_{g1}$ and $\lambda_{g2}$ respectively designate the guided waveguides corresponding to the angular frequencies $(\omega + \omega_0)$ and $(\omega - \omega_0)$, and if $c(x)$ designates the common value of the couplings at $M_1$ and $M_2$, the signals $S_1$ and $S_2$ arriving at the base of the radiator R will have respectively as values in respect of amplitude and phase, and taking into account the values of $y$ and $d$ expressed above:

(2)

$$s_1 = \tfrac{1}{2} c(x) e^{j(\omega + \omega_0)t + j\varphi} e^{-j\frac{2\pi}{\lambda_{g1}}[a + x(1 + \cos \alpha)]}$$

$$s_2 = \tfrac{1}{2} c(x) e^{j(\omega - \omega_0)t - j\varphi} e^{-j\frac{2\pi}{\lambda_{g2}}[L(\cdot 1 + \cos \alpha) + 2a]} e^{j\frac{2\pi}{\lambda_{g2}}[a + x(1 + \cos \lambda)]}$$

Figure 3:
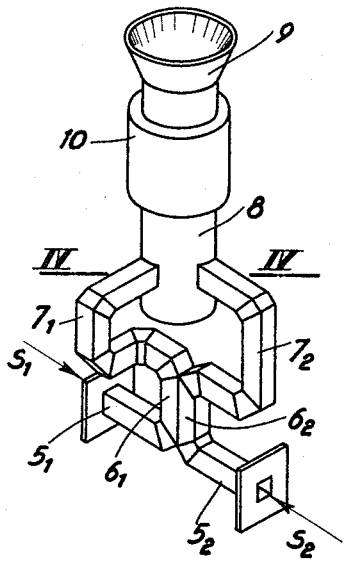
FIGURE 3 is a perspective view of the arrangement of the feeding of a radiator.

These two signals $S_1$ and $S_2$ are applied to the radiator R as illustrated in FIGURE 3. They arrive respectively through the guides $5_1$ ($M_1R$) and $5_2$ ($M_2R$) which are connected by 90° elbows to one of the ends of the respective elements $6_1$ and $6_2$ of a Riblet type coupler, the other ends of these elements leading into bent guides $7_1$ and $7_2$ designed to be connected laterally in two planes perpendicular to one another to a circular guide 8 functioning in the mode $H_{11}$ for the angular frequency $\omega$, having its axis perpendicular to the direction of the guides $5_1$ and $5_2$ and to the plane of FIGURE 1, said guide being extended by the actual radiator constituted by a circular horn 9. On the circular guide 8 there is interposed in known manner a rotator constituted by a ferrite disposed in the guide and surrounded outside the latter by a coil 10. The constitution and operation of a rotator of this type have been described in detail, particularly by C. L. Hogan in "The Bell System Technical Journal," vol. XXXI, No. 1, January 1952, p. 1 (see also "Techniques de l'Ingénieur," vol. Electronique, E 242–12, 2466–1956).

At the two outputs of the Riblet coupler $6_1$ $6_2$ the following signals are collected:

$$\Sigma_1 = S_1 + S_2 e^{j\frac{\pi}{2}}$$

$$\Sigma_2 = S_1 e^{j\frac{\pi}{2}} + S_2$$

which, taking into account the expressions of $S_1$ and $S_2$ (2) may be written as follows:

$$\Sigma_1 = c(x) e^{j\omega t} e^{j\psi} e^{-j\pi x(1+\cos \alpha)\left(\frac{1}{\lambda g_1} - \frac{1}{\lambda g_2}\right)}$$
$$\cos\left[\omega_0 t - \frac{\pi}{4} + \psi' - \pi x(1+\cos \alpha)\left(\frac{1}{\lambda g_1} + \frac{1}{\lambda g_2}\right)\right]$$

$$\Sigma_2 = c(x) e^{j\omega t} e^{j\psi} e^{-j\pi x(1-\cos \alpha)\left(\frac{1}{\lambda g_1} - \frac{1}{\lambda g_2}\right)}$$
$$\cos\left[\omega_0 t + \frac{\pi}{4} + \psi' - \pi x(1+\cos \alpha)\left(\frac{1}{\lambda g_1} + \frac{1}{\lambda g_2}\right)\right]$$

$\psi$ and $\psi'$ being angles independent of $\omega$, $\omega_0$ and $x$, and having the respective values:

$$\psi = \frac{\pi}{4} - \frac{\pi}{\lambda g_2}[L(1+\cos \alpha) + 2a] + \pi a\left(\frac{1}{\lambda g_2} - \frac{1}{\lambda g_1}\right)$$

$$\psi' = \varphi + \frac{\pi}{\lambda g_2}[L(1+\cos \alpha) + 2a] - \pi a\left(\frac{1}{\lambda g_2} - \frac{1}{\lambda g_1}\right)$$

The combination of the signals $S_1$ and $S_2$ on the Riblet coupler therefore gives two signals $\Sigma_1$ and $\Sigma_2$ of angular frequency $\omega$, the amplitudes of which are modulated sinusoidally in quadrature and the common phase of which is proportional to $x$ by a factor $1/\lambda g_1 - 1/\lambda g_2$ which is dependent on the frequency.

The two signals $\Sigma_1$ and $\Sigma_2$ being applied to the circular guide 8 by two couplings perpendicular to one another, a mode $H_{11}$ of amplitude $c(x)$ independent of $t$ and turning at the frequency $\omega_0$ of the modulation is obtained.

The sinusoidal factors of amplitude contain a term $x$, namely $-\pi x(1+\cos \alpha)(-1/\lambda g_1 + 1/\lambda g_2)$. Consequently, the rotating fields in the successive radiators R, to which different values of $x$ correspond, are angularly offset by a value corresponding to this term in $x$. In order to obtain in the radiators rotating fields which are equipollent to one another at every moment, it is consequently necessary to correct this term in $x$ from one radiator to the next. This may be done by means of angular offsetting $+\pi x(1+\cos \alpha)(1/\lambda g_1 + 1/\lambda g_2)$ of the points of attack of the circular guides 8 by the guides $7_1$ and $7_2$ which are perpendicular to one another. Nevertheless, if the carrier wave $\omega$ must be able to vary within a very wide band, it is preferable to utilise the rotators 10 for the purpose of making this connection, by passing through the coil of the rotator of each radiator a current such that the field acting on the corresponding ferrite will bring about, for given values of $\omega$ and $\omega_0$, an angular displacement of the rotating field equal to $+\pi x(1+\cos \alpha)(1/\lambda g_1 + 1/\lambda g_2)$, to within a multiple of $2\pi$.

The circular horns 9 of the radiators thus behave like equipollent dipoles, rotating together at the angular speed $\omega_0$, and radiating at the frequency $\omega$ with a phase proportional to $x$; for a given frequency $\omega$, the proportionality factor $1/\lambda g_1 - 1/\lambda g_2$ depends on the frequency of modulation $\omega_0$. The function $c(x)$ corresponding for example to Chebyshev's distribution, the array factor comprises a central beam, the direction of which will depend on the angular frequency $\omega_0$ of the modulation.

For a determined transmission frequency $\omega$, it will therefore be possible to cause the radiated beam to sweep in the plane of the axes of the radiators R by acting only on the modulation $\omega_0$; if necessary, the frequencies $\omega + \omega_0$ and $\omega - \omega_0$ will be inverted at the inputs $A_1$ and $A_2$ in order to change the inclination of the beam, if the median direction corresponds to zero $\omega_0$. In practice, the abscissae $x$ of the points $M_1$, that is to say the abscissae of the radiators on the array PQ, will be suitably selected to ensure that the median direction is obtained for a value of $\omega_0$ which is different from zero.

Taking the foregoing into account, it is seen that the signal transmitted has a term in $x$, on the one hand in its phase, namely:

$$p = \pi x(1+\cos \alpha)(1/\lambda g_1 - 1/\lambda g_2)$$

and on the other hand in its angle of rotation:

$$q = \pi x(1+\cos \alpha)(1/\lambda g_1 + 1/\lambda g_2)$$

It is first seen that, if the distance between two neighbouring radiators of the array PQ is designated by $u$, their feed points $M_1$ and $M'_1$ are spaced apart by the distance $$\Delta x = u/\sin \alpha$$

Therefore, for the same distance $u$, if $\lambda g_1$ and $\lambda g_2$ are fixed, the variation of phase will be the greater, the smaller the value of $\alpha$, that is to say the greater the inclination of the feed guides $A_1B_1$ and $A_2B_2$ in relation to the array PQ.

Two cases must be envisaged depending on whether the waveguides are of the coaxial type or of the "strip-line" type. Functioning in their fundamental mode TEM, or whether they are true waveguides.

In the first case, the guided wavelengths $\lambda g_1$ and $\lambda g_2$ are respectively equal to the wavelengths in the propagation medium, namely $\lambda_1$ and $\lambda_2$, and, designating by $c$ the speed of light, we have:

$$\omega + \omega_0 = 2\pi c/\lambda_1 \text{ and } \omega - \omega_0 = 2\pi c/\lambda_2$$

Further designating by $\lambda$ the wavelength in vacuo, corresponding to the angular frequency $\omega$, which gives:

$$\omega = 2\pi c/\lambda$$

We can therefore write:

$$p = \frac{x}{c}(1+\cos \alpha)\omega_0 = x(1+\cos \alpha)\frac{2\pi}{\lambda}\frac{\omega_0}{\omega}$$

$$q = \frac{x}{c}(1+\cos \alpha)\omega = \frac{2\pi x}{\lambda}(1+\cos \alpha)$$

It is seen that in this case $p$ is exactly proportional to $\omega_0$, while $q$ is independent of $\omega_0$. Therefore, if we change $\omega_0$ without changing $\omega$, the term $q$ does not change and it will not be necessary to modify the adjustment of the rotators; these rotators may be eliminated, with a fixed value of $\omega$, if the feeds of the circular guides 8 of the successive radiators comprise a suitable fixed angular offsetting for the correction of the term in $x$.

In the second case, that is to say the case of true waveguides, if we designate by $\lambda c$ the cutoff wavelength (which is equal to twice the height of the cross-section of the guide in the case of a rectangular guide) and by $\lambda$ the guided wavelength, we shall have:

$$p = \frac{2\pi x}{\lambda}(1 + \cos\alpha)\frac{\lambda g}{\lambda}\frac{\omega_0}{\omega} + 0\left(\frac{\omega_0}{\omega}\right)^3$$

$$q = \frac{2\pi x}{\lambda}(1 + \cos\alpha)\left[1 - \frac{1}{2}\frac{\lambda g}{\lambda^2 \lambda c^2}\left(\frac{\omega_0}{\omega}\right)^2 + 0\left(\frac{\omega_0}{\omega}\right)^3\right]$$

It is seen that $p$ remains linear in $\omega_0/\omega$ to within the third order, and that $q$ remains independent of $\omega_0/\omega$ to within the second order.

If $\omega_0$ is varied without modifying $\omega$, it is possible that a correction of the term $q$ will be necessary with the aid of the rotators. An analog or digital calculator may be used, in a manner known per se, in order to determine the magnetic fields to be developed in the rotators for each frequency $\omega$, and also the additional corrections in the case where $\omega_0/\omega$ becomes too great, and for applying to the coils 10 of the various rotators the desired currents to develop said fields.

In its main application, the radiating device described above may be utilised as a radar antenna. The radar thus equipped therefore transmits rotating field radiation, and a target receiving this transmission will return a signal in which the amplitude modulation at the frequency $\omega_0$ will be found. The array according to the invention will receive this signal modulated in this manner, but the rotators interposed on the circular waveguides of the radiators will, in accordance with their principle of operation, turn the plane of polarisation in the same direction as for the transmission and not in the opposite direction the only effect will be that the wave $\omega + \omega_0$ will pass to the receiver in the guide where $\omega - \omega_0$ passed for the transmission, and vice versa. It will therefore be possible to combine the two signals in order to obtain a received wave of frequency $\omega$, modulated in amplitude at this frequency $\omega_0$.

If a signal at the frequency $\omega$ arrives on the antenna but if the field turns at an angular speed $\omega'_0$ which is different from $\omega_0$, the antenna will receive it if it comes from the direction in which the field turning at the speed $\omega'_0$ would be transmitted. In particular, the antenna receives non-rotating signals coming from its axis which represents the direction of the non-rotating field wave, if this axis corresponds to the modulation $\omega = 0$.

Actually, it is possible to modify the preceding array so that its axis corresponds to a frequency $\omega_0$ which is not equal to zero. For this purpose (FIGURE 1a) it is sufficient to give different inclinations $\alpha_1$ and $\alpha_2$ (instead of the same inclination $\alpha$ in FIGURE 1) to the two principal guides $A_1B_1$ and $A_2B_2$ in relation to the direction of the axis of the array which is that of $A_2B_1$ or $A_1B_2$ or $M_1M_2$. The previous calculation is more convenient in this case if we take as parameter fixing the position of the radiator instead of the abscissae $x$ on the main guide $A_1B_1$ the abscissa $\overline{PR} = u$ on the array PQ.

Designating by $L_1$ and $L_2$ the respective lengths of the guides $A_1B_1$ and $A_2B_2$, by $\underline{l}$ the length of the array PQ, by $x_1$ and $x_2$ the respective abscissae of the points $M_1$ and $M_2$ on the guides $A_1B_1$ and $B_2A_2$, and by $\alpha_1$ and $\alpha_2$ the respective angles of said guides $A_1B_1$ and $A_2B_2$ with the perpendicular to the array PQ, we shall have:

$$\overline{PR} = u = x_1 \sin\alpha_1 = x_2 \sin\alpha_2$$
$$\underline{l} = L_1 \sin\alpha_1 = L_2 \sin\alpha_2$$

The signals $\Sigma_1$ and $\Sigma_2$ become under these conditions:

$$\Sigma_1 = c(x)e^{j\omega t}e^{j\psi}e^{-j\pi u\left(\frac{\cot g\frac{\alpha_1}{2}}{\lambda g_1} - \frac{\cot g\frac{\alpha_2}{2}}{\lambda g_2}\right)}\cos\left[\omega_0 t - \frac{\pi}{4} + \psi' - \pi u\left(\frac{\cot g\frac{\alpha_1}{2}}{\lambda g_1} + \frac{\cot g\frac{\alpha_2}{2}}{\lambda g_2}\right)\right]$$

$$\Sigma_2 = c(x)e^{j\omega t}e^{j\psi}e^{-j\pi u\left(\frac{\cot g\frac{\alpha_1}{2}}{\lambda g_1} - \frac{\cot g\frac{\alpha_2}{2}}{\lambda g_2}\right)}\cos\left[\omega_0 t + \frac{\pi}{4} + \psi' - \pi u\left(\frac{\cot g\frac{\alpha_1}{2}}{\lambda g_1} + \frac{\cot g\frac{\alpha_2}{2}}{\lambda g_2}\right)\right]$$

with $$\psi = \frac{\pi}{4} - \frac{\pi}{\lambda g_2}\left(1\cot g\frac{\alpha_2}{2} + 2a\right) + \pi a\left(\frac{1}{\lambda g_1} - \frac{1}{\lambda g_1}\right)$$

$$\psi' = \phi + \frac{\pi}{\lambda g_2}\left(1\cot g\frac{\alpha_2}{2} + 2a\right) - \pi a\left(\frac{1}{\lambda g_1} + \frac{1}{\lambda g_2}\right)$$

In these formulae, it has been taken into account that $$\cot g\frac{\alpha}{2} = \frac{1 + \cos\alpha}{\sin\alpha}$$

The direction of the axis of the beam is obtained when all the radiators are in phase, that is to say when $$\frac{\cot g\frac{\alpha_1}{2}}{\lambda g_1} - \frac{\cot g\frac{\alpha_2}{2}}{\lambda g_2} = 0$$

If the transmission lines are of the coaxial type, we shall have:

$$\frac{2\pi c}{\lambda g_1} + \omega + \omega_0 \frac{8\pi c}{\lambda g_2} = \omega - \omega_0$$

After multiplication by $2\pi c$, the preceding relation is written:

$$\omega_0\left(\cot g\frac{\alpha_1}{2} + \cot g\frac{\alpha_2}{2}\right) + \omega\left(\cot g\frac{\alpha_1}{2} - \cot g\frac{\alpha_2}{2}\right) = 0$$

that is to say:

$$\omega_0 = \omega_{0m} = \frac{\cot g\frac{\alpha_2}{2} - \cot g\frac{\alpha_1}{2}}{\cot g\frac{\alpha_1}{2} + \cot g\frac{\alpha_2}{2}}\omega$$

If it is desired to incline the beam by $\pm 30°$ or $\pm \pi/6$ radian on each side of the axis of the array, $\omega_0$ will have to assume one or the other of the values given by replacing $u$ by $$\lambda\left(\frac{2\pi c}{\lambda} - \omega\right)$$

in the common phase factor at $\Sigma_1$ and $\Sigma_2$ and by equalising this phase factor to $\pm\pi$, that is to say:

$$\pi\lambda\left[\frac{\cot g\frac{\alpha_1}{2}}{\lambda g_1} - \frac{\cot g\frac{\alpha_2}{2}}{\lambda g_2}\right] = \pm\pi$$

that is to say, after multiplication by 2 and division by $\lambda$:

$$\frac{2\pi}{\lambda g_1}\cot g\frac{\alpha_1}{2} - \frac{2\pi}{\lambda g_2}\cot g\frac{\alpha_2}{2} = \pm\frac{2\pi}{\lambda}$$

or else, passing to the angular frequencies $$\omega_0\left(\cot g\frac{\alpha_1}{2} + \cot g\frac{\alpha_1}{2}\right) = \left(\cot g\frac{\alpha_1}{2} - \cot g\frac{\alpha_2}{2} \pm 1\right)\omega$$

or else, taking into account the value of $\omega_{0m}$:

$$\omega_0 = \omega_{0m} \pm \frac{\omega}{\cot g\frac{\alpha_1}{2} + \cot g\frac{\alpha_2}{2}}$$

It will be seen that the swinging of the modulation $\omega_0$ for a sweep of $-30°$ to $+30°$ will be:

$$\Delta\omega_0 = \frac{2\omega}{\cot g\frac{\alpha_1}{2} + \cot g\frac{\alpha_2}{2}}$$

If it is desired that $\Delta\omega_0$ should be fairly low, the denominator must be very high, and therefore the guides $A_1B_1$ and $A_2B_2$ must be considerably inclined in relation to the array PQ. With regard to $\omega_{0m}$, this will be the greater, the greater the difference between the angles $\alpha_1$ and $\alpha_2$.

It is to be observed that the inclination of a guide $A_1B_1$ or $A_2B_2$ on PQ has the effect of increasing the number of wavelengths contained in that guide for a given array length. Consequently an inclined guide may be replaced by a filled guide lengthened artificially, for example filled with dielectric or undulating. In this case the power stages may be placed just before the radiators.

As has been seen, the arrangement described above makes it possible to provide an array of rotating dipoles the angular transmission frequency of which is $\omega$ and the angular rotational speed of which is $\omega_0$, making it possible to carry out a sweep of the beam transmitted by said array. Nevertheless, as has been stated above, actually a division of the beam into two is effected, which gives rise to a particular difficulty in the case where the angular modulation frequency $\omega_0$ is relatively high, and it is then necessary to have recourse to a difference arrangement in order to feed each radiator from the corresponding Riblet coupler $6_1$, $6_2$.

In fact, considering the rotating dipole $\vec{E}$ constituted by a radiator situated at a point O in the array $P\varphi$ and referring this dipole to two perpendicular axes $Ou$ and $Ov$ (FIGURE 10), the axis $Ou$ coinciding with the line $P\varphi$ of the array of radiators the axes of which are perpendicular to the plane of the figure, $\vec{y}$ and $\vec{z}$ being unitary vectors of said axes $Ou$ and $Ov$, the dipole $\vec{E}$ may be expressed in the form:

$$\vec{E} = e^{j(\omega t + \Phi)} \vec{y} \cos(\omega_0 t + \psi) + \vec{z} \cos\left(\omega_0 t + \psi + \frac{\pi}{2}\right)$$

$\Phi$ and $\psi$ being phases independent of $\omega_0$.

Decomposing the two cosines according to Euler's formulae, we can write:

$$\vec{E} = \frac{1}{2} e^{j[(\omega+\omega_0)t + \Phi + \psi]}(\vec{y} + j\vec{z}=) + \frac{1}{2} e^{j[(\omega-\omega_0)t + \Phi - \psi]}(\vec{y} - j\vec{z})$$

The rotating dipole of angular frequency $\omega$ and of rotational speed $\omega_0$ therefore results from the composition of circular polarised radiators in opposite directions, having respective angular frequencies of $\omega + \omega_0$ and $\omega - \omega_0$. As the intervals of the radiators of the array are the same for these two frequencies, there will therefore be a division of the beam into two; if $\omega_0$ is low, or if the beam is wide, this division into two will not be appreciable and the device will be utilisable in the form described above, in which each radiator is fed by a circular symmetry waveguide acted on at two orthogonal points by the outputs of the corresponding Riblet coupler. On the other hand, if the beam is narrow, and if $\omega_0$ is high, the two beams will be distinct and there will be only weak transmission in the interesting direction, framed by strong transmissions in neighbouring directions; the arrangement described above will therefore not be utilisable.

In order to avoid this frequency dispersion, when the ratio $\omega_0/\omega$ is no longer much lower than unity, instead of the circular symmetry guide fed by two inputs at right angles to its base, a coupler (FIGURE 11) having two inputs 14 and 15 of variable admittance and one output 16 of fixed admittance may be used.

In a manner known per se the inputs 14 and 15 of this coupler each comprise a diode or a gas tube 17, 18 depending on whether the energy which is to pass through them is weak or strong, or even both devices if the signals may be sometimes weak and sometimes strong, as is the case with a radar. These diodes or gas tubes may be adapted to the inputs by ideal transformers 19 and 20; the control voltages applied to each diode or gas tube 17, 18 are such that the admittance of each of the arms is proportional to the power of the signal arriving there.

The signals $\Sigma_1$ and $\Sigma_2$ originating from the corresponding Riblet coupler $6_1$, $6_2$ are applied respectively to the inputs 14 and 15 of the coupler thus constituted. The respective voltages $E_1$ and $E_2$ are of the form:

$$E_1 = E_0 e^{j(\omega t + \Phi)} \cos(\omega_0 t + \psi)$$
$$E_2 = E_0 e^{j(\omega t + \Phi)} \cos(\omega_0 t + \psi + \pi/2)$$

The admittances of the inputs 14 and 15 are in parallel and are respectively:

$$Y_1 = Y_0 \cos^2(\omega_0 t + \psi)$$
$$Y_2 = Y_0 \cos^2(\omega_0 t + \psi + \pi/2)$$

$Y_0$ designating the characteristic admittance of each incoming line.

The powers supplied by said signals are thus:

$$Y_0 E_1 E_1^* = Y_0 E_0^2 \cos^2(\omega_0 t + \psi)$$

and $$Y_0 E_2 E_2^* = Y_0 E_0^2 \sin^2(\omega_0 t + \psi)$$

If however the diode supply on the lines admittances $Y_1$ and $Y_2$ such that:

$$Y_1 = Y_0 \cos^2(\omega_0 t + \psi)$$
$$Y_2 = Y_0 \sin^2(\omega_0 t + \psi)$$

the powers arriving through the arms 14 and 15 will be written respectively:

$$Y_1 E_0^2 \text{ and } Y_2 E_0^2$$

The arms 14 and 15 being in parallel, the admittance of the entire arrangement, viewed from the output arm, will be:

$$Y_1 + Y_2 = Y_0$$

and, if $Y_0$ is also the characteristic admittance of the output arm; the output power will be $$E_0^2 = Y_1 E_1 E_1^* + Y_2 E_2 E_2^*$$

independent of $\omega_0$.

The radiators fed by these outputs will therefore no longer transmit a rotating field and the array which they constitute will have the usual properties of a radiator array of angular frequency $\omega$. The distribution of the phases will nevertheless be linear in relation to the abscissa $u$ of the radiator on the array with a coefficient which depends on the frequency $\omega_0$. A variation of the modulation $\omega_0$ will therefore vary the inclination of the beam.

Figure 5:
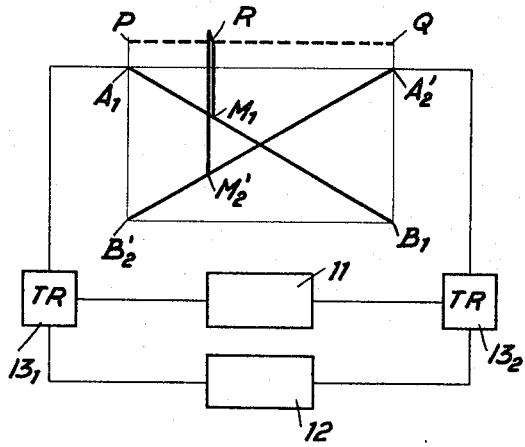

In practice, in order to avoid placing the waveguides $A_1B_1$ and $A_2B_2$ on each side of the array, the arrangement will be folded over as illustrated in FIGURE 1, along the line PQ in such a manner as to place all the guides behind the line of radiators, as shown in FIGURE 5, the two main feed guides then forming a cross $$A_1B_1 - A'_2B'_2$$

This line of radiators may thus for example be placed in front of a reflector.

In FIGURE 5, the two guides $M_1R$ and $M'_2R$ have been shown with slight offsetting for the sake of clarity in the drawing, but it is obvious that we must always have:

$$A_1M_1 = B'_2M_2 = x = u \sin \alpha$$

in the case where the guides $A_1B_1$ and $A'_2B'_2$ are equally inclined in relation to the array PQ. If they form with the normal to the array the angles $\alpha_1$ and $\alpha_2$, defined above and different from one another, as illustrated in FIGURE 5a, we shall have:

$$A_1M_1 = x_1 = u \sin \alpha_1 \text{ and } B'_2M_2 = x_2 = u \sin \alpha_2$$

On the other hand, in the case of FIGURE 5, it has been assumed that this related to the application of the invention to a radar and the transmitter 11 has been illustrated diagrammatically which emits the signals $$s_1 = \tfrac{1}{2} e^{j(\omega+\omega_0)t + j\varphi}$$

and $$s_2 = \tfrac{1}{2} e^{j(\omega-\omega_0)t - j\varphi}$$

the receiver 12 designed to receive the deflected signals, and the transmit/receive switches $13_1$ and $13_2$ which alternately switch over to the transmitter and to the receiver.

The arrangement described above relates to a single linear array. If this linear array feeds elementary radiators placed along the focal line of a parabolic cylindrical reflector, a fine beam is thus obtained but one which can sweep only in one plane, namely an axial plane of symmetry of the parabolic cylinder.

Nevertheless, by application of the mode of feeding radiators according to the invention, it is possible to effect two sweeps in respective planes perpendicular to one another, which makes it possible to obtain a fine beam capable of sweeping the entire volume of a portion of space.

For this purpose, as has been illustrated diagrammatically in FIGURE 6, $n$ linear arrays $P_aQ_a \ldots P_iQ_i \ldots P_nQ_n$ are associated with one another, and the interval between two successive arrays may be such that the distance between the axes of two corresponding radiators on two adjacent arrays will be equal to that between two consecutive radiators on the same array or determined differently by those versed in the art. A plane array is thus obtained.

This embodiment is described below, assuming that the various feed guides are equally inclined in relation to the array ($\alpha_1 = \alpha_2 = \alpha$) in order to simplify the figures, but it will easily be conceived that, in order to prevent the direction of the beam normal to the plane of the array corresponding to a zero modulation frequency, it is possible, similarly to the arrangement developed above for a single linear array, to adopt an arrangement in which the inclinations of the guides in relation to the plane array are different in each of the pairs of guides ($\alpha_1 \neq \alpha_2$).

Each linear array such as $P_aQ_a$ is fed, as will be explained further on, by two sets of cross guides, hereinafter referred to as special guides, similar to the feed guides of the embodiment previously described and indicated diagrammatically in FIGURE 6 by the lines $A_1, B_1, A_2B_2$. The juxtaposition of all these cross guides therefore has the general shape of a parallelepiped and each guide $A_1B_1$ of this series is fed by one or the other of two cross guides $C_1D_1$ and $C'_1D'_1$, referred to hereinbelow as general cross guides and disposed in accordance with one of the side faces of the parallelepiped which is perpendicular to the direction of the arrays PQ, while the guides $A_2B_2$ are fed by similar general cross guides $C_2D_2$ and $C'_2D'_2$ disposed along the opposite side face of the parallelepiped.

FIGURE 7 illustrates, likewise diagrammatically but in greater detail, the connections between the general cross guides and all the cross guides corresponding to one of the linear arrays $P_iQ_i$, and also the connections between the guides of this series and one of the radiators $R_i$ of the linear array. The feeding of the general cross guides has likewise been indicated diagrammatically in FIGURE 7.

Each series of cross guides comprises two juxtaposed parallel guides $A_1B_1, A'_1B'_1$ and, symmetrically to these guides, two other identical juxtaposed guides $A_2B_2, A'_2B'_2$. The end $A_1$ of the guide $A_1B_1$ is connected by a length of guide $A_1N_1$ to the general guide $C_1D_1$ and the end $A'_1$ of the guide $A'_1B'_1$ is connected by a length of guide $A'_1N'_1$ to the general guide $C'_1D'_1$, the total of these distances $C_1N_1$ and $C'_1N'_1$ being equal to the length L of the guides $C_1D_1$ or $C'_1D'_1$. Similarly, the end $A_2$ of the guide $A_2B_2$ is connected to the general guide $C_2D_2$ by a length of guide $A_2N_2$, while the end $A'_2$ of the guide $A'_2B'_2$ is connected by a length of guide $A'_2N'_2$ to the general guide $C'_2D'_2$, the total of the distances $C_2N_2$ and $C'_2N'_2$ being equal to the length L of the guides $C_2D_2$ or $C'_2D'_2$ and the distances $A_1N_1, A_2N_2$ being equal, because of the actual constitution of the series, similarly to the distances $A'_1N'_1$ and $A'_2N'_2$.

Each radiator R of the linear array $P_iQ_i$ is connected to the special guides $A_1B_1, A'_1B'_1, A_2B_2, A'_2B'_2$ by respective waveguides $RM_1, RM'_1, RM_2, RM'_2$, the distances $A_1M_1, A'_1M'_1$ being equal to one another, as is also true of the distances $A_2M_2$ and $A'_2M'_2$ and the total of the distances $A_1M_1, A_2M_2$ being equal to the length L of the guides $A_1B_1$ or $A_2B_2$.

As previously, a generator 21 produces a signal of angular frequency $\omega$ modulated in amplitude in a modulator 22 according to the law $\cos(\omega_0 t + \varphi)$ by a signal produced by a generator 23. The resulting signals of angular frequencies $(\omega + \omega_0)$ on the one hand and $(\omega - \omega_0)$ on the other hand which are obtained at the outputs of respective suitable filters $24_1$ and $24_2$ associated with the modulator 22 are applied respectively to modulators $25_1$ and $25_2$ in which they are modulated in amplitude according to the law $\cos(\omega_1 t + \varphi)$ by a signal produced by the generator 26.

Following the same reasoning as previously, there are obtained on the one hand at the output of suitable filters $27_1$ and $27'_1$ associated with the modulator $25_1$, two signals $s_1$ and $s'_1$ of respective angular frequencies $[(\omega + \omega_0) + \omega_1]$ and $[(\omega + \omega_0) - \omega_1]$ and, on the other hand at the respective outputs of two filters $27_2$ and $27'_2$ associated with the modulator $25_2$ two signals $s_2$ and $s'_2$ of respective angular frequencies $[(\omega - \omega_0) + \omega_1]$ and $$[(\omega - \omega_0) - \omega_1]$$

A similar calculation to that developed in connection with FIGURE 1 shows that there are finally obtained at the base of each of the radiators R four signals $S_1, S'_1, S_2, S'_2$ at the same angular frequencies as the signals $s_1, s'_1, s_2, s'_2$ and the phases of which are simultaneously dependent on the distance $C_1N_1$ (or $A_2N_2$, which amounts to the same thing) corresponding to the series of special cross guides in the linear array considered, and of the distance $A_1M_1$ (or $A'_1M'_1$) corresponding to the radiator considered in said linear array.

The two signals $S_1$ and $S'_1$ are combined two by two (FIGURE 8) on a Riblet coupler 28, giving two signals $\delta_1$ and $\delta'_1$ of angular frequency $(\omega + \omega_0)$, and the two signals $S_2$ and $S'_2$ are combined on another Riblet coupler 29 to give two signals $\delta_2$ and $\delta'_2$, of angular frequency $(\omega - \omega_0)$, all four signals thus obtained being modulated sinusoidally at the angular frequency $\omega_1$ and dephased two by two by $\pi/2$. One of the signals of frequency $(\omega + \omega_0)$, for example $\delta_1$, and the signals of frequency $(\omega - \omega_0)$ of which the modulations are in phase with said signal $\delta_1$, it being assumed that this signal will be $\delta_2$, are in turn combined on a third Riblet coupler 30 giving two signals $\Sigma_1$ and $\Sigma_2$ of angular frequency $\omega$ and modulated sinusoidally in amplitude, for example respectively at $\cos \omega_1 t \cos \omega_0 t$ and at $\cos \omega_1 t \cos(\omega_0 t + \pi/2)$. Starting from the other two signals of respective frequencies $(\omega + \omega_0)$ and $(\omega - \omega_0)$, that is to say in the series selected $\delta'_1$ and $\delta'_2$, there are similarly obtained by combination on a fourth Riblet coupler 31 two signals $\Sigma_3$ and $\Sigma_4$ likewise of angular frequency $\omega$, which are modulated in amplitude respectively at $\cos(\omega_1 t + \pi/2) \cos \omega_0 t$ and at $\cos(\omega_1 t + \pi/2) \cos(\omega_0 t + \pi/2)$.

Figure 4:
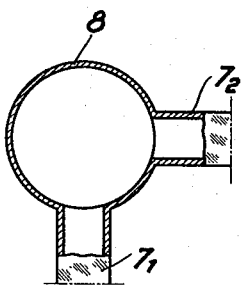
FIGURE 4 is a diagrammatical view in section on the line IV—IV in FIGURE 3.

If the radiators are fed by a circular guide, in the case of a wide beam array or of an angular frequency $\omega_0$ which is small in relation to these four signals $\Sigma_1, \Sigma_2, \Sigma_3, \Sigma_4$, are applied to the base of a circular guide 10 preceding the radiator R, in similar manner to the description given with reference to FIGURES 3 and 4, for example with the distribution illustrated in FIGURE 9.

In the association of the signals $\Sigma_1, \Sigma_2, \Sigma_3, \Sigma_4$ considered in FIGURE 9, the resulting field turns at the angular speed $(\omega_1 + \omega_0)$.

If the frequency $\omega_0$ is a not negligible fraction, the signals $\Sigma_1$ and $\Sigma_2$ are supplied to the inputs of a coupler having variable input admittances, of the type described above and diagrammatically illustrated in FIGURE 11, so as to obtain at the output a signal $\Sigma_{1,2}$ (FIGURE 12) the amplitude of which now depends only on $\omega_1$, and similarly the signals $\Sigma_3$ and $\Sigma_4$ to the input of a second coupler having variable input admittances so as to obtain at the output a signal $\Sigma_{3,4}$ the amplitude of which depends only on $\omega_1$ the outputs of these two couplers are supplied in turn to the inputs of a third coupler having variable input admittances, so as to obtain finally a signal $\Sigma$ the amplitude of which no longer depends on $\omega_0$ or on $\omega_1$, but the phase of which is the phase common to the signals $\Sigma_1$, $\Sigma_2$, $\Sigma_3$, $\Sigma_4$, dependent on $\omega_0$ and $\omega_1$.

In this way, a variation of $\omega_0$ determines a relative phase shift of the signals in the radiators along each linear array PQ, and consequently an inclination of the beam in the plane passing through the axis perpendicular to the plane array and parallel to the linear arrays, while a variation of $\omega_1$ determines a relative phase shift of the signals arriving at each linear array and consequently an inclination of the beam in the plane passing through the axis perpendicular to the plane array and parallel to the linear arrays.

To sum up, with an arrangement according to the invention and containing only a single linear array, the direction of the beam transmitted, and also that of the beam received, in the case of application to a radar, varies electronically by simple variation of the frequency of modulation $\omega_0$ and without requiring the precise determination of a phase to be supplied to an electronically controlled phase shifter for each direction of the beam. If rotators are necessary, the magnetic fields to be applied to them depend as a first approximation only on the frequency $\omega$ of the carrier.

In the case of a low $\omega_0$ or of a wide beam, because of the modulation $\omega_0$ the signal transmitted is not confused with other signals even of the same frequency $\omega$, and consequently active jamming has very slight chance of interfering with reception.

Moreover, by giving the feed guides different inclinations in relation to the axis of the array, it is possible to ensure that the direction of radiation perpendicular to the array PQ will correspond to a modulation $\omega_0$ which is not zero, thus simplifying the technology of the reception device.

Finally, by juxtaposing a plurality of linear and feed arrays, by two series of general cross guides, special cross guides for each of these linear arrays, it is possible to produce a plane array transmitting a beam which may be directed, according to the same principle, in all the directions of the space situated in front of said plane array.

Various modifications may be made to the exemplified embodiments described above, without departing from the scope of the invention.

Thus in the case of a linear array it is possible to replace the modulation signal or each of the modulation signals of the cos $(\omega_0 t+\varphi)$ type applied to the transmitter by a total of similar signals $$\sum_{i=1}^{i=n} \cos(\omega_i t + \varphi_i)$$

thus permitting simultaneous transmission on a plurality of beams; in radar, the device will receive echos coming from the directions of these various beams and will distinguish them by the values of $\omega_1$. In the case of a plane array, if $n$ signals of the $\omega_0$ type and $m$ signals of the $\omega_1$ type are superimposed, $mn$ beams are obtained.

In addition, it will be conceived that the principle of the arrangement according to the invention, considered above for an impulse radio detector, may be applied, mutatis mutandis, to a frequency modulation radio detector; in this case the feed lines must in principle be of the coaxial or strip-line type, in order that the inclination of the beam will not be dependent on the fundamental frequency.

It will finally be noted that use may be made of an elementary radiator such as that illustrated, by itself and without a rotator, as an antenna for jamming a radio detector utilising the device according to the invention in the case in which it transmits a rotating field. For this purpose it will be sufficient to apply directly the respective signals $s_1$ and $s_2$ (1) to the two inputs of the Riblet type coupler $6_1$, $6_2$, that is to say through the waveguides $5_1$ and $5_2$.

What is claimed is:

1. An apparatus for rapid pointing of an electromagnetic beam, comprising a plurality of radiators forming a linear array and arranged to radiate an arbitrary polarisation wave; means for separately producing the two side bands of a sinusoidally modulated carrier frequency, and means for varying the frequency of this sinusoidal modulation; two waveguides feeding said linear array; means for applying the two said side bands respectively to the inputs of said feed waveguides; couplers spaced on each of these feed waveguides which start from the input of the latter and the number of which is equal to the number of the radiators, each coupler of a given order on one of the feed waveguides and each coupler of inverse order of the other feed waveguide being respectively connected to two lengths of waveguides ending respectively at the two inputs of a Riblet type coupler, thus producing at the two outputs of said Riblet type coupler two signals on the carrier frequency which are respectively modulated in amplitude by two sinusoids in quadrature, and means for combining these two signals and for applying them to the corresponding radiator.

2. Apparatus as claimed in claim 1 in which the means for producing the two side bands of the sinusoidally modulated frequency comprise a first generator arranged to produce a signal of angular frequency $\omega$, connected to a modulator, a second generator arranged to emit a signal cos $(\omega_0 t+\varphi)$, a modulator fed by these two generators and arranged to effect the modulation of the signal of the first generator by that of the second, producing a signal of the type $$e^{j(\omega+\omega_0)t+j\varphi} e^{j(\omega-\omega_0)t-j\varphi}$$

and at least one filter associated with said modulator to effect the separation of the signals $$e^{j(\omega+\omega_0)t+j\varphi}$$

and $$e^{j(\omega-\omega_0)t-j\varphi}$$

3. Apparatus as claimed in claim 2 in which the second generator is arranged to produce a total of signals $$\sum_{i=1}^{i=n}(\cos \omega_i t + \varphi_i)$$

4. Apparatus as claimed in claim 1 in which the means for combining the two final signals and applying them to each radiator comprises a circular symmetry waveguide, associated with said radiator and to the base of which the outputs of the corresponding Riblet type coupler are connected through the medium of two waveguides acting on said circular symmetry waveguide at two orthogonal points.

5. Apparatus as claimed in claim 1 in which the means for combining the two final signals and applying them to each radiator comprise a coupler having two variable admittance inputs and one fixed admittance output, making it possible to obtain a signal of amplitude independent of $\omega_0$ but of a phase tied to $\omega_0$.

6. Apparatus as claimed in claim 4 in which a ferrite rotator is interposed in the circular waveguide of each radiator.

7. Apparatus as claimed in claim 1 in which the feed waveguides are disposed in the form of a cross.

8. An apparatus for rapid pointing of an electromagnetic beam comprising in association a plurality of linear arrays of radiators forming a series of parallel arrays each comprising substantially the same number of radiators, each radiator of a linear array being fed by four lengths of guides coupled respectively two by two in the manner defined above, with two juxtaposed pairs of special feed waveguides, one of the ends of the special juxtaposed waveguides, belonging to one of the pairs associated with the different linear arrays, being connected to lengths of waveguide coupled in the manner defined above to a first pair of general feed waveguides situated in a plane perpendicular to the linear arrays, and the corresponding opposite end of the special juxtaposed feed waveguides, belonging to the other pair associated with the different linear arrays, being connected in the same manner to a second pair of general feed waveguides similar to the first pair, the length of waveguides associated with a given radiator and coupled to the special feed waveguides fed by the first pair of general feed waveguides leading on the other hand respectively to the inputs of a first Riblet type coupler and the other two lengths associated with the same radiator similarly leading to the inputs of a second Riblet type coupler, one of the outputs of the first Riblet type coupler and one of the outputs of the second being respectively connected to the inputs of a third Riblet type coupler, and the other outputs of the first and second Riblet type couplers being connected respectively to the inputs of a fourth Riblet type coupler, and the outputs of said third and fourth Riblet type couplers being connected respectively to means arranged to combine the four signals thus obtained and to apply them to the radiator considered, means being provided to produce separately the side bands of a carrier wave of frequency $\omega$, which are modulated sinusoidally by a frequency $\omega_0$, in order to remodulate sinusoidally said two side bands by a frequency $\omega_1$ and to separate the side bands from the signals resulting from this double modulation and to apply to the respective ends of the four general feed waveguides the resulting signals of angular frequency $\omega+\omega_0+\omega_1$, $\omega+\omega_0-\omega_1$, $\omega-\omega_0+\omega_1$ and $\omega-\omega_0-\omega_1$, and also to vary at will the frequencies $\omega_0$ and $\omega_1$.

References Cited

UNITED STATES PATENTS 3,173,145   3/1965   Bowman _____ 343—778

ELI LIEBERMAN, *Primary Examiner.*